Jan. 7, 1947. L. S. HAMER 2,413,869
VALVE
Filed June 11, 1940
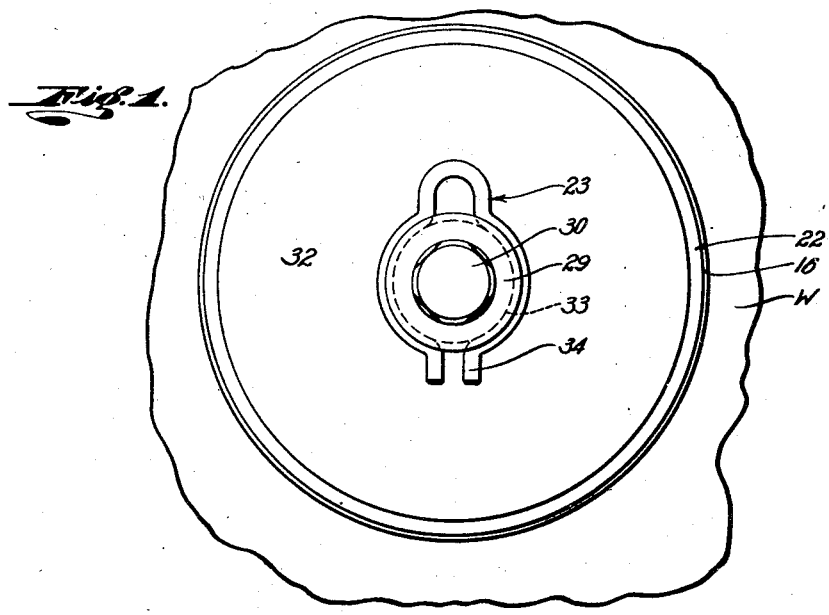
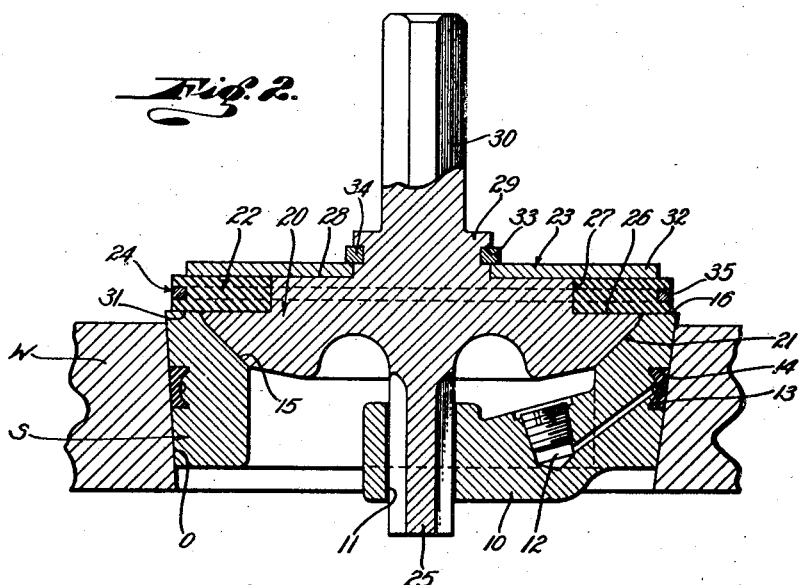
Inventor
LELAND S. HAMER
By
His Attorney Patented Jan. 7, 1947

2,413,869

UNITED STATES PATENT OFFICE 2,413,869

VALVE

Leland S. Hamer, Long Beach, Calif., assignor, by direct and mesne assignments, to Falcon Products, Inc., Los Angeles, Calif., a corporation of California Application June 11, 1940, Serial No. 339,917

8 Claims. (Cl. 251—127)

1

This invention relates to valves and relates more particularly to valves of the class employed in slush pumps, and like devices. A general object of the invention is to provide an effective long-wearing valve of the class mentioned.

The valves of slush pumps and other pumps handling fluid under high pressures are subjected to severe impacts and to considerable wear. It is the usual practice to provide valves of this kind with what are known as inserts to absorb or dampen the impact and to assist in sealing with the seats. The insert is usually a disc or ring of rubber held on the upper part of the valve by a retaining plate or nut and projecting from the periphery of the valve above the metal sealing face of the valve. The peripheral portion of the insert is exposed to seal downwardly against the seat and to be acted on by the fluid pressure in the valve chest, which pressure forces it against the seat. The exposed portion of the insert absorbs liquid and swells because of this absorption. In many cases the insert swells to such a size that it will not pass through the opening in the upper wall of the valve chest, making it very difficult to remove the valve when the valve or seat require repair or replacement. Further, the insert often wears away or cuts out along a line occurring at the upper peripheral corner of the valve sealing face. It is believed that this cutting action of the insert occurs because the insert is under tension at this point when the fluid under high pressure passes between the valve and seat as the valve begins to open and this fluid under high pressure cuts into the stretched or tensioned rubber. Attempts have been made to correct these defects by arranging the insert in a groove in the lower face of the valve with ports provided in the valve to admit fluid pressure behind the insert. Valves having the inserts arranged in grooves have not proved entirely satisfactory because the pressures on the insert are unequal and the ports and groove become clogged with sand or particles of solid matter.

Another object of this invention is to provide a pump valve embodying a novel insert that cannot expand or swell to any appreciable extent.

Another object of this invention is to provide a pump valve in which the under side of the insert, at the upper end of the valve sealing face, remains unstressed and substantially free of tension under all operating conditions, so that the fluid discharging past the valve as the valve opens wears and cuts away the insert to a minimum extent.

Another object of this invention is to provide

2 a pump valve of the character mentioned in which the peripheral active portion of the insert is exposed and unconfined to be fully and evenly acted upon by the fluid pressure in the valve chest.

Another object of this invention is to provide a pump valve embodying a restraining ring set in the periphery of the insert to prevent or limit the lateral or radial swelling of the insert and to prevent stretching and tensioning of the exposed portion of the insert.

A further object of this invention is to provide a pump valve of the character referred to that is simple and inexpensive to manufacture, the inclusion of the restraining ring adding but little to the cost of the valve.

The various objects and features of my invention will be fully understood from the following detailed description of a typical preferred form and application of the invention, throughout which description reference is made to the accompanying drawing, in which:

Fig. 1 is a plan view of the improved valve of the present invention in position on a valve seat, and Fig. 2 is a vertical detailed sectional view of the valve and valve seat showing the valve in the closed position.

The present invention may be embodied in valves varying considerably in form and use. In the drawing I have shown the invention embodied in a slush pump valve for cooperating with a readily removable valve seat S of the character described and claimed in my co-pending application Serial No. 319,701, filed February 19, 1940, which issued as Patent Number 2,271,137 on January 27, 1942. The seat S is an annular member set in a tapered opening O in the pump frame or valve chest wall W. The periphery of the seat S is tapered to fit the tapered opening O. A web 10 is provided in the seat S and has a central vertical opening 11. A port 12 in the web 10 leads outwardly through the seat S to a groove 13 formed in the periphery of the seat. A sealing ring 14 is provided in the groove 13. Pressure admitted to the port 12 by a fluid pressure means (not shown) is delivered to the inner portion of the groove 13 behind the ring 14 and acts through the medium of the sealing ring 14 to expand the metal of the wall W around the opening O to free the seat S for ready removal. This action is fully described in my co-pending application referred to above. The seat S is provided with a suitably designed tapered sealing face 15 and has a flat horizontal upper face 16 at the upper end of the tapered sealing face 15. It is to be understood that the valve of the invention is not restricted for use with the particular seat S illustrated, but may be employed with other forms of seats.

The improved valve of the present invention may be said to comprise, generally, a valve body 20 having a sealing surface 21 for sealing with the face 15 of the seat S, an insert 22 carried by the valve 20 adapted to seal with the end face 16 of the seat S, means 23 for removably retaining the insert 22 on the valve body 20, and a ring 24 associated with the insert 22 to limit expansion and stressing of the same.

The valve body 20 is the main element of the valve and as illustrated may be an integral, generally disc-shaped member. The periphery of the valve body 20 is tapered and designed to evenly and effectively seal with the face 15 of the seat S, being shaped to constitute the sealing surface 21. A fluted stem 25 projects from the lower end of the valve body 20 and is slidable in the opening 11 to guide the valve. The upper end of the valve body 20 is shaped to receive the insert 22 and the retaining means 23. A flat, generally horizontal shelf 26 of substantial area extends inwardly from the upper end of the sealing surface 21 to an abrupt or vertical shoulder 27. The parts are related so that the shelf 26 is flush with the end face 16 of the seat S when the valve is in its closed position. A second shelf 28 extends inwardly from the shoulder 27 to a central boss 29 of the body 20. The shelves 26 and 28 are preferably annular and concentric. The usual guide stem 30 extends upwardly from the boss 29. It will be observed that the body 20, just described, is of simple construction.

The insert 22 is a sealing element formed of rubber, synthetic rubber, rubber composition, or other yielding resilient sealing material. In the preferred construction the insert 22 is an annular or ring-shaped part having flat upper and lower sides and cylindrical concentric inner and outer surfaces. The insert 22 seats or rests on the shelf 26 and its inner side or internal surface bears on the vertical shoulder 27. The upper face or surface of the insert 22 is substantially flush with the shelf 28. In accordance with the invention the insert 22 is proportioned to extend outwardly beyond, or to overhang, the valve body 20. In practice the insert 22 has a lower surface 31 extending horizontally outward beyond the sealing surface 21 of the body 20, which surface 31 is adapted to cooperate and seal with the end face 16 of the seat S when the valve is in its closed position. The periphery of the insert 22 is fully exposed to the fluid pressure in the valve chest.

The means 23 serves to retain the insert 22 on the valve body 20 and is such that the insert may be easily removed from the body for replacement. In accordance with the broader aspects of the invention the retaining means 23 may be of any suitable type and construction. In the form of the invention illustrated the means 23 comprises a retaining plate 32 engaging over the shelf 28 and the insert 22. The plate 32 is annular or ring-shaped and is passed down over the boss 29. The lower side of the plate 32 is flat and horizontal to evenly bear on the flat upper side of the insert 22. In accordance with the invention the retaining plate 32 is smaller in diameter than the insert 22 to leave the peripheral part of the insert 22 exposed to the action of the fluid pressure in the valve chest. As clearly illustrated in the drawing the parts are related so that the insert 22 has its upper surface exposed to the fluid pressure beyond the periphery of the retaining plate 32.

An annular groove 33 is formed in the boss 29 and a spring clip or lock 34 is sprung into the groove 33. The lock 34 is engaged in the groove 33 and cooperates with the upper side of the plate 32 to hold the plate in position. The clip or lock 34 is such that it may be spread and disengaged from the groove 33 to permit upward removal of the plate 32 and the insert 22. It will be observed that the insert 22 retained on the valve body 20 in the manner just described has its major portion confined by the shelf 26, shoulder 27 and plate 32 and has a peripheral portion of substantial size that is fully exposed to the fluid pressure. This exposed peripheral portion of the insert 22 is the active part of the insert and operates to bear and seal against the end face 16 of the seat S.

The ring 24 is provided to prevent excessive swelling of the insert 22 and to prevent stressing or tensioning of the insert. The restraining ring 24 is associated with the active exposed peripheral portion of the insert 22. It is a feature of the invention that the ring 24 does not interfere with the free sealing action of the insert 22 or the even distribution of pressures on the insert. The restraining ring 24 may be a continuous ring of metal, or the like, and is preferably substantially unyielding. As illustrated, the ring 24 may be square or rectangular in cross section. The vertical dimension of the ring 24 is considerably less than that of the insert 22 and the ring is preferably inset in the periphery of the insert between the upper and lower sides of the insert. In the construction illustrated an annular groove 35 is formed in the periphery of the insert 22 substantially midway between the upper and lower faces of the insert to receive the restraining ring 24. The ring 24 may either be sprung into the groove 35 by suitable manipulating of the insert and ring or may be molded or vulcanized in the groove. The outer surface or periphery of the ring 24 may be flush with the periphery of the insert 22. The depth or radial thickness of the ring 24 may, of course, be varied. In the arrangement illustrated the radial thickness of the ring 24 is substantially equal to the radial extent of the exposed upper surface of the insert.

The invention contemplates the provision of inserts 22, having restraining rings 24, designed for application to and use on pump valves varying greatly in construction and shape. Accordingly, the invention is not to be construed as limited or restricted to the particular form or application of the insert and restraining ring shown and described.

In operation the valve opens and closes with the pump strokes, in the well known manner. With the valve in the closed position the sealing surface 21 seals with the face 15 and the under surface 31 of the insert 22 seals against the end face 16 of the seat S. The fluid pressure above the valve acts downwardly on the body 20 to urge the surface 21 against the face 15 and acts directly against the exposed portion of the insert 22 to hold the surface 21 in tight sealing cooperation with the end face 16. Thus there is a metal to metal sealing engagement between the seat S and the valve body 20 and a rubber to metal sealing engagement between the seat S and the insert 22. The heavy fluid pressures that may be applied to the insert 22 both directly against the exposed surfaces of the insert and through the medium of the retaining plate 32 distort and expand the insert 22 to a minimum extent. The restraining ring 24 engaged about or set in the periphery of the insert 22 prevents or at least limits the radial expansion of the insert by the imposed pressures. The restraining ring 24 set in the periphery of the insert 22 also prevents or limits radial swelling or expansion of the insert that might otherwise result from the absorption of liquids. Such absorption of liquids by the rubber insert 22 cannot cause appreciable radial swelling of the insert. Accordingly, the insert 22 never becomes much larger in diameter than when initially installed and never interferes with the free end easy removal of the valve through the access opening in the top of the valve chest. The restraining ring 24 being set or embedded in the periphery of the insert 22 does not in any way limit or interfere with the balanced distributed application of fluid pressure on the insert which operates to hold the insert in effective sealing contact with the end face 16 of the seat S.

When the valve begins to open the fluid under high pressure discharges upwardly between the face 15 and the sealing surface 21 and this fluid under pressure strikes the under surface 31 of the insert 22. In conventional slush pump valves this fluid under pressure impinging against the under surface of the insert quickly cuts into and wears away the rubber insert due to the fact that the fluid pressures on the insert hold the lower exposed part of the insert under tension and the fluid impinging against the stretched tensioned rubber soon cuts it away. In the improved construction of the present invention the restraining ring 24 set in the insert 22 at its periphery prevents stretching and outward tensioning of the insert so that the lower surface 31 of the insert is unstressed and untensioned. The upwardly directed fluid under pressure impinging against this yielding unstretched and unstressed surface 31 does not cut into the rubber and wears the insert to a minimum extent. The restraining ring 24 greatly prolongs the effective life of the insert 22 by preventing tensioning of that portion of the insert that is impinged against by the fluid under pressure. When the valve recloses the lower surface 31 of the insert 22 comes into contact with the end face 16 of the seat S to dampen the impact of the sealing surface 21 with the seat face 15 and to again seal with the seat face 16. After extended use the insert 22 may become worn. The clip or lock 34 is easily disengaged from the groove 33 so that the plate 32 may be removed to expose the insert 22 for removal. A new or replacement insert 22 carrying a restraining ring 24 may be quickly installed on the valve.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A sealing insert for a pump valve comprising a generally flat annular body of yielding sealing material, and a substantially rigid ring at the periphery of the body to be substantially flush therewith and confined to the peripheral part of the body and confining the body against radial expansion.

2. An insert for a pump valve comprising a generally flat annular body of rubber, or the like, and a rigid metal ring carried on and confined to the peripheral portion of the body for limiting radial expansion and tensioning of the body while allowing axial flexure thereof.

3. An insert for a pump valve comprising an annular body of rubber or the like having generally parallel upper and lower sides, the peripheral portion of the lower side forming a sealing face, and a metal ring carried on the peripheral portion of the body above the outer edge portion of the sealing face for limiting expansion and tensioning of the body, the ring being spaced from the upper and lower sides of the body and being confined to said peripheral portion so that it does not interfere with axial flexure of the body.

4. In combination with a valve seat having a generally flat upper face and a face sloping inwardly away from the upper face, a valve body having a sloping lower face for sealing with the sloping face of the seat and a generally flat upwardly facing shelf at the upper end of the lower face, the shelf being parallel with and lying in substantially the same plane as said upper face when said sloping faces are in engagement, a generally flat flexible resilient sealing disc resting on the shelf and proportioned to freely project radially beyond the shelf to have a free annular projecting portion whose lower side is adapted to seal with said upper face of the seat and whose periphery and upper side are exposed to action of fluid pressure, means engaging the disc inward of said portion to retain it on the shelf, and a substantially rigid ring on said portion of the sealing disc for limiting radial distortion and swelling of said portion while allowing said portion to float and flex under the action of the fluid pressure.

5. In combination with a valve seat having a generally flat upper face and a face sloping inwardly away from the upper face, a valve body having a sloping lower face for sealing with the sloping face of the seat and a generally flat upwardly facing shelf at the upper end of the lower face, the shelf being parallel with and lying in substantially the same plane as said upper face when said sloping faces are in engagement, a generally flat flexible resilient sealing disc resting on the shelf and proportioned to have a free lip portion projecting radially beyond the shelf, the lower side of the lip being adapted to seal with said upper face of the seat while the periphery and upper side of the lip are exposed to action of fluid pressure, means for engaging the upper side of the disc inward of the lip to retain the disc on the shelf and leaving the lip of the disc exposed, and a substantially rigid ring confined to the periphery of said lip of the disc for limiting distortion thereof while allowing free flexure thereof so that the lip may have effective sealing engagement with said upper face of the seat.

6. In combination with a valve seat having an exposed upper end with a sealing face, a valve body of rigid material having a sealing face on its under side for cooperating with the sealing face of the seat and having an upwardly facing shelf at the upper end of its sealing face which is parallel with and lies in substantially the same plane as said upper end of the seat when said sealing faces are in cooperation, an annular sealing insert of flexible resilient material having substantially parallel upper and lower sides and arranged with the inner edge portion of its lower side on the shelf, the insert being proportioned to extend freely radially beyond the shelf and sealing face of the body to have a free floating peripheral portion whose under side is adapted to seal with the upper end of the seat, a retainer engaged against the upper side of the insert at the inner edge portion thereof for retaining the insert on the shelf and proportioned to leave the upper side of said free floating portion exposed, and a substantially rigid member recessed in the periphery of said floating portion and spaced between its upper and lower surfaces for limiting radial distortion and tensioning of said portion, said member being confined to the peripheral part of said floating portion so that it does not interfere with the free vertical flexure of said free floating portion.

7. A sealing insert for use in a pump valve so its peripheral portion projects to form a sealing part comprising a washer-like annular body of yielding sealing material with a peripheral portion having an end sealing face and a peripheral outer edge, and a rigid ring applied to the said peripheral outer edge to be confined thereto and to be spaced from the sealing face.

8. A sealing insert for use in a pump valve comprising a washer-like annular body of yielding sealing material with an inner edge portion adapted to be engaged and held by the valve and having a free flexible radially projecting outer lip portion with a substantially flat radially disposed sealing face and an outer edge substantially axially disposed and provided intermediate its ends with an annular groove, and a rigid retaining ring applied to the groove to confine the body against radial expansion and confined to the outer edge so the sealing face is unobstructed.

LELAND S. HAMER.